Patented Dec. 28, 1948

2,457,599

UNITED STATES PATENT OFFICE 2,457,599

METHOD OF CLOSING TUBE ENDS BY DIPPING IN MOLTEN SOLDER

Leopold Pessel, Philadelphia, Pa., assignor to Radio Corporation of America, a corporation of Delaware Application October 27, 1944, Serial No. 560,725

5 Claims. (Cl. 113—112)

1

The present invention relates to a method of soldering and more particularly to the closing of the ends of tubular bodies.

In soldering operations as heretofore carried out to close the ends of tubular bodies, such as contact pins for receiving terminal wires, the resultant closure is unsatisfactory because it is either in the form of a concave depression or a pointed "beard," neither of which provides the desired efficient contact surface. Furthermore, more often than otherwise, pin holes, roughness and other irregularities are present which are due to the surface tension phenomena taking place in the molten solder filling at the time of withdrawing the tubular body from the pot of molten solder.

Some of the objects of the present invention are: to provide a novel method of closing the ends of tubular bodies; to provide a method wherein a substantially hemispherical closure is formed on the end of a tubular body; to provide an electrical contact pin more efficient than has been possible heretofore; to provide a closure for a tubular contact pin wherein the closure contact is free from pin holes and roughness; to provide a closure for a tubular contact pin wherein a more perfect joint can be had with a terminal wire; and to provide other improvements as will hereinafter appear.

Figure 1:
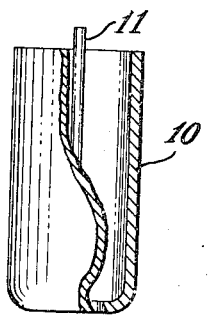
Figure 2:
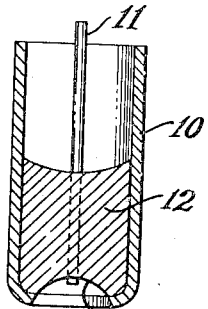
Figure 3:
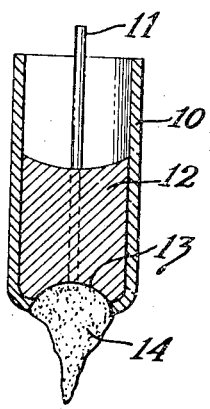
Figure 4:
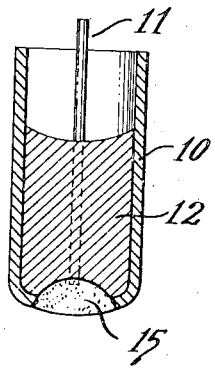

In the accompanying drawings, Fig. 1 is a longitudinal view partly in section of a tubular contact with conducting wire in position for soldering in acordance with the present invention; Fig. 2 is a sectional view showing the contact and conductor after the first step of the method; Fig. 3 is a sectional view showing the contact and conductor after the second immersion in solder; and Fig. 4 is a sectional view showing the finished contact and conductor.

Referring to the drawings, Fig. 1 shows a tubular contact 10 with the end of a conducting wire 11 in place preparatory to soldering.

The method comprises modifying the interface tension of the solder in such a manner as to produce a closure having substantially an hemispherical shape free from pin holes, and roughness, and thus forming a smooth, regular contact head.

The steps of the method comprise dipping the tubular body or contact pin in rosin flux and then into molten solder contained within a solder pot. Since the inside of the pin is well tinned by contact with the flux solder, the solder 12, Fig. 2, will be drawn so that when removed and cooled the dipped end of the pin 10 will appear

2 as a concave depression 13. This concave depression is always desirable after the first step as it indicates adequate penetration of solder into the interior of the pin.

In order to form the required contact protection or "beard" on the end of the pin, the pin end is now given a brief immersion in the solder in the pot and upon withdrawal, a globular projection, or "beard" 14 will be found adhering to the pin end. In some instances, to ensure the desired "beard" it may be found necessary to dip the end (prior to the above immersion) in a nonmetallic liquid, such as a petroleum solvent, and this invariably causes the "beard" to be found upon immersion as explained in the foregoing step. With the "beard" formed upon the end of the pin, the next step is to float an oil, such as petrolatum, upon the surface of the molten solder and bring the beard end of the pin into contact with the surface of the molten solder in the pot, while surrounded by a pool of the oil. While it is preferred to use hot oil on top of the molten solder, satisfactory results may be obtained by using a bath of oil at a temperature above the melting point of the solder, and without a pool of molten solder beneath. In either procedure, the time of pin immersion should be brief, the time of immersion being determined by the size of the pin, size of the "beard," pot temperature, and amount and nature of the oil.

For obtaining a bright finish and also to wash off excess of oil, the hot pin end can be quenched in a suitable solvent, such, for example, as a heavy mineral as Solvesso, a petroleum hydrocarbon.

While the production of a substantially hemispherical end projection 15 is one of the results of the method, another important result for quality requirements resides in a deep penetration of the solder into the interior of the pin. This will be well indicated by the appearance of the concave crater following the first dipping step. To ensure this penetration, absolute cleanliness of the interior surface must be certain and this may be obtained by reaming, drilling or other mechanical or chemical operation. This may also be accomplished by pre-tinning according to known chemical or electro-chemical methods. Preferably, a hot tinning procedure is desirable, using an aggressive flux to overcome a dirty or otherwise difficult surface condition. Such a hot tinning procedure has been satisfactorily carried out both on silver-plated and nickel-plated brass pins as follows: Solid 60–40 solder (or some other suitable solder composition) is mixed with a flux, preferably an organic ester of phosphoric acid in either of its several hydration stages. This mixture is placed inside of the pin near the opening to be soldered. Pieces of the selected solder wire wetted with an alcoholic solution of isopropyl acid pyrophosphate are used for this purpose. Solder heat is then applied and the excess solder removed by some convenient means, such as shaking, centrifugal action or brushing. The interior and exterior of the pin are now washed (in this case with water and alcohol) to remove any flux residue. The pins are now ready for carrying out the steps of the invention as heretofore described.

While in the foregoing specific recital of the method as applied to a pin has been given, it is to be understood that the word "pin" is used with a broad meaning and is intended to cover any suitable tubular body requiring a definite finished end. In a similar manner the term "oil" is used to include materials having oil-like characteristics when the "oil," waxes, silicones, and the like are subjected to temperatures above their melting points.

I claim as my invention:

1. The method of closing the end of a tubular body, comprising successively dipping an end of the body in a rosin flux and in molten solder, cooling the dipped end, again dipping the end in molten solder, and finally dipping the end in a pool of oil on the surface of the molten solder, the temperature of said oil being higher than the melting point of said solder.

2. The method of closing the end of a tubular body, comprising dipping an end of the body in molten solder to form a concave depression, cooling the dipped end, again dipping the end in molten solder to transform the concave depression into a globular projection, and finally dipping the projection end in a pool of oil on the surface of the molten solder, the temperature of said oil being higher than the melting point of said solder.

3. The method of closing the end of a tubular body, comprising dipping an end of the body in molten solder to form a concave depression, cooling the dipped end, again dipping the end in molten solder to transform the concave depression into a globular projection, and finally dipping the projection end in a molten material held above the melting point of solder and having oil-like spreading properties on molten solder.

4. The invention as set forth in claim 3, characterized by the final dipping being done in molten wax held above the melting point of solder and having oil-like spreading properties on molten solder.

5. The invention as set forth in claim 3, characterized by the final dipping being done in molten silicone held above the melting point of solder and having oil-like spreading properties on molten solder.

LEOPOLD PESSEL.

REFERENCES CITED

The following references are of record in the file of this patent:

UNITED STATES PATENTS

| Number | Name | Date |
|---|---|---|
| 699,592 | Thompson | May 6, 1902 |
| 1,702,234 | Goodridge | Feb. 12, 1929 |
| 1,783,642 | Ferguson | Dec. 2, 1930 |
| 2,293,455 | Disch | Aug. 18, 1942 |